(12) United States Patent  
Chen

(10) Patent No.: US 8,098,554 B2
(45) Date of Patent: Jan. 17, 2012

(54) TILT DETECTING DEVICE AND METHOD

(75) Inventor: Ying-Che Chen, Guangdong (CN)

(73) Assignee: Hon Hai Precision Industry Co., Ltd., Tucheng Dist., New Taipei (TW)

( * ) Notice: Subject to any disclaimer, the term of this patent is extended or adjusted under 35 U.S.C. 154(b) by 1396 days.

(21) Appl. No.: 11/457,450

(22) Filed: Jul. 13, 2006

(65) Prior Publication Data

US 2007/0147199 A1 Jun. 28, 2007

(30) Foreign Application Priority Data

Dec. 23, 2005 (CN) .......................... 2005 1 0121222

(51) Int. Cl.
*G11B 11/00* (2006.01)
(52) U.S. Cl. ............... 369/53.19; 369/44.13; 369/44.32; 369/44.28
(58) Field of Classification Search ............... 369/44.13, 369/44.32, 53.19, 44.28, 124.05, 124.07
See application file for complete search history.

(56) References Cited

U.S. PATENT DOCUMENTS

| 4,866,688 | A * | 9/1989 | Ohtake et al. ............... 369/44.13 |
| 6,243,337 | B1 | 6/2001 | Miyanabe et al. |
| 6,249,498 | B1 | 6/2001 | Miyanabe et al. |
| 6,947,360 | B2 | 9/2005 | Jeong |

* cited by examiner

*Primary Examiner* — Joseph Haley
*Assistant Examiner* — Huy Nguyen
(74) *Attorney, Agent, or Firm* — Winston Hsu; Scott Margo

(57) ABSTRACT

An information recording and/or reproducing apparatus includes an optical head, an analog signal processor, an analog/digital converter, a controller and a digital/analog converter. The optical head is used for emitting a light beam on a medium and receiving a reflected light beam from the medium. The analog signal processor is used for processing the reflected light beam to obtain a first analog signal. The analog/digital converter is used for converting the first analog signal into a digital signal. The controller is used for applying a low-pass filtering operation on the digital signal to obtain a digital controlling signal. The digital/analog converter is used for converting the digital controlling signal into a second analog signal. The second analog signal is transmitted to the optical head for correcting a tilt between the light beam and the medium.

20 Claims, 7 Drawing Sheets

TILT DETECTING DEVICE AND METHOD

FIELD OF THE INVENTION

This invention relates to optical recording and/or reproducing apparatuses and, more particularly, to a tilt detecting device for an optical recording and/or reproducing apparatus and a tilt detecting method thereof.

DESCRIPTION OF RELATED ART

Recently, optical media are widely used due to their mass storage capacity. Accordingly, optical recording/reproducing apparatuses for recording information to and/or reproducing information from the optical media are also widely used. A general optical recording and/or reproducing apparatus includes an optical head for emitting a light beam and then focusing the light beam to form a light spot on a recording surface of a medium. The medium modulates and reflects the incident light beam to form a reflected light beam back at the optical head. The reflected light beam is then used for reproducing information recorded on the medium. However, the light beam is usually tilted with respect to the medium, thereby making it difficult to accurately reproduce the recorded information.

In order to detect and correct the tilt of the light beam with respect to the medium, tilt detectors are employed. Referring to FIG. 7, an optical recording and/or reproducing apparatus 70 includes an optical head 72 and a tilt detector 74. The optical head 72 includes a light source 720 for emitting a light beam, a first lens 722, a light-splitting element 724, a second lens 726, an adjustment mechanism 728 for adjusting a position of the second lens 726, a third lens 730, and a light-receiving element 732. The light source 720 emits the light beam that then passes through the first lens 722, the light-splitting element 724, and the second lens 726 to form a light spot on a medium 76. The medium 76 modulates the light beam and reflects the modulated light beam to form a reflected light beam that then passes through the second lens 726 to the light-splitting element 724. The light-splitting element 724 reflects the reflected light beam to the third lens 730 that focuses the reflected light beam on the light-receiving element 732. The light-receiving element 732 transforms the reflected light beam to electric signals. The electric signals include focusing error signals and tracking error signals. The tilt detector 74 includes two sensors 740 and 742 for reading signals at two adjacent regions of the medium 76, and a signal processor 744 for processing the read signals from the sensors 740 and 742. The signal processor 744 calculates differences between the read signals from the sensors 740 and 742, and extracts controlling signals from the differences. The controlling signals are then transmitted to the adjustment mechanism 728 to adjust the position of the second lens 726 so as to correct a tilt of the light beam relative to the medium 76.

However, in the above-mentioned optical recording and/or reproducing apparatus 70, an extra space for setting the two sensors 640 and 642 is needed, thereby, miniaturization of the optical recording and/or reproducing apparatus 70 is obstructed, and also, an extra cost is brought into the optical recording and/or reproducing apparatus 70.

Therefore, a tilt detecting device without tilt sensors is desired.

SUMMARY OF THE INVENTION

An information recording and/or reproducing apparatus includes an optical head, an analog signal processor, an analog/digital converter, a controller and a digital/analog converter. The optical head is used for emitting a light beam on a medium and receiving a reflected light beam from the medium. The analog signal processor is used for processing the reflected light beam to obtain a first analog signal. The analog/digital converter is used for converting the first analog signal into a digital signal. The controller is used for applying a low-pass filter on the digital signal to obtain a digital controlling signal. The digital/analog converter is used for converting the digital controlling signal into a second analog signal. The second analog signal is transmitted to the optical head for correcting a tilt between the light beam and the medium.

A tilt detecting device includes a first low-pass filter. The first low-pass filter performs a function of: $C_1(X)=(K_1*X+K_2)/(X-K_3)$, wherein $C_1(X)$ represents a signal that is low-pass filtered by the first low-pass filter, X is a variable parameter and represents an input signal of the first low-pass filter, $K_1$, $K_2$, and $K_3$ are constant parameters of the first low-pass filter.

A tilt detecting method includes steps of: receiving a reflected light beam from a medium; converting the reflected light beam into an electrical signal; converting the electrical signal into a digital signal; and applying a low-pass filter on the digital signal to obtain a tilt detecting signal.

Other advantages and novel features will become more apparent from the following detailed description of preferred embodiments when taken in conjunction with the accompanying drawings, in which:

BRIEF DESCRIPTION OF THE DRAWINGS

Many aspects of the present tilt detecting device system and the present tilt detecting method thereof can be better understood with reference to the following drawings. The components in the drawings are not necessarily to scale, the emphasis instead being placed upon clearly illustrating the principles of the present disc drive. Moreover, in the drawings, like reference numerals designate corresponding parts throughout the several views.

DETAILED DESCRIPTION OF THE INVENTION

Reference will now be made to the drawings to describe the preferred embodiment of the present tilt detecting device and tilt detecting method, in detail.

Figure 1:
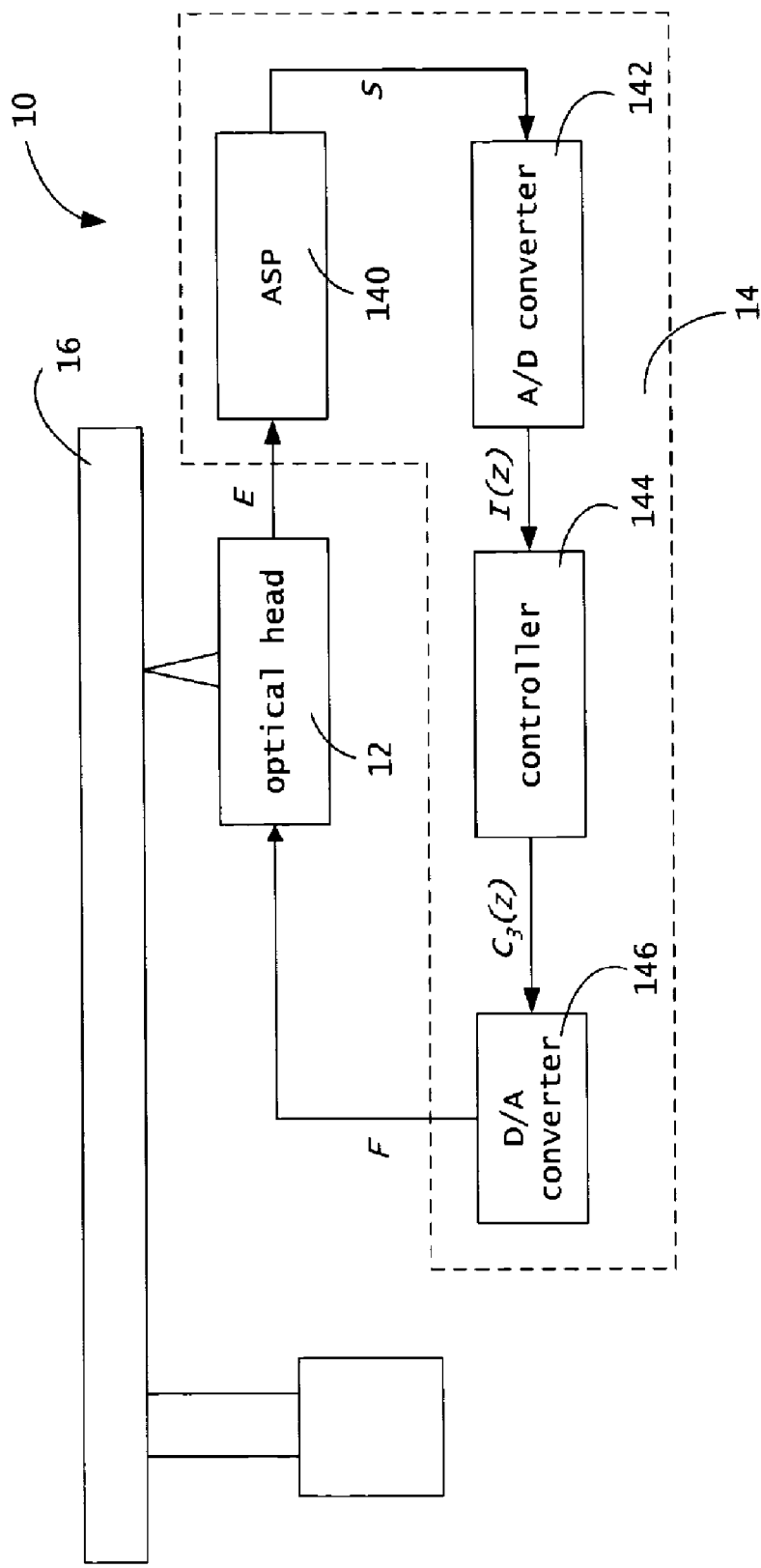
FIG. 1 is a block diagram of an information recording and/or reproducing apparatus in accordance with an exemplary embodiment, the information recording and or reproducing apparatus including an optical head and a controller.

Referring to FIG. 1, an information recording and/or reproducing apparatus 10 includes an optical head 12 and a tilt detecting device 14. The optical head 12 is used for emitting a light beam and focus the light beam on a medium 16. The medium 16 modulates and reflects the incident light beam to form a reflected light beam to the optical head 12. The reflected light beam is used for reproducing information recorded on the medium 16. The tilt detecting device 14 is electrically connected to the optical head 12 and extracts a tilt error signal based on the reflected light beam.

Figure 2:
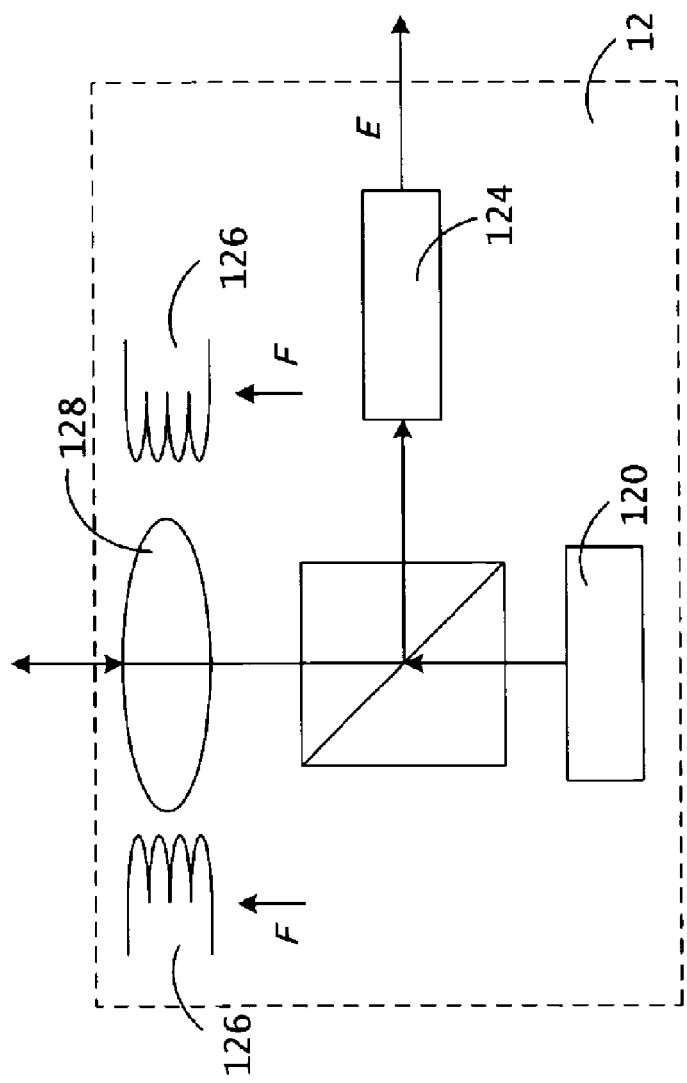
FIG. 2 is a block diagram of the optical head of FIG. 1.

Referring also to FIG. 2, the optical head 12 includes a light source 120, a photodetector 124, an adjustment mechanism 126, and a lens 128. The light source 120 emits the light beam and the lens 128 focuses light beam on the medium 16. The medium 16 modulates the incident light beam and reflects the incident light beam to form a reflected light beam. The reflected light beam is then transmitted to the photodetector 124. The photodetector 124 converts the reflected light beam to an electrical signal E that is then transmitted to the tilt detecting device 14. The electrical signal E includes a tracking error signal and a focusing error signal.

The tilt detecting device 14 includes an analog signal processor (ASP) 140, an analog/digital (A/D) converter 142, a controller 144, and a digital/analog (D/A) converter 146. The ASP 140 receives the electrical signal E from the optical head 12, applies mathematical operations based on the electrical signal E according to predetermined rules, and then samples and amplifies the calculated results to obtain a first analog signal S. The A/D converter 142 samples and quantizes the first analog signal S to obtain a digital signal I(z), wherein z represents a frequency of the first analog signal S.

According to the Nyquist Sampling Theorem, the sampling rate of the A/D converter 142 should not be less than twice of a maximum frequency of the first analog signal S. Optionally, the sampling rate can be set to a value of 44.1 KHz. The digital signal I(z) passes through the controller 144 and is low-pass filtered by the controller 144, so that a high frequency signal of the digital signal I(z) is removed and a low frequency signal of the digital signal I(z) is remained. After the low-pass filtering, the digital signal I(z) is changed to a digital controlling signal $C_3(z)$.

The digital controlling signal $C_3(z)$ is converted into a second analog controlling signal F by the D/A converter 146. The second analog controlling signal F is then transmitted to the adjustment mechanism 126. Based on the second analog controlling signal F, the adjustment mechanism 126 adjusts the position of the lens 128 so as to correct a tilt existing between the light beam and the medium 16.

Figure 3:
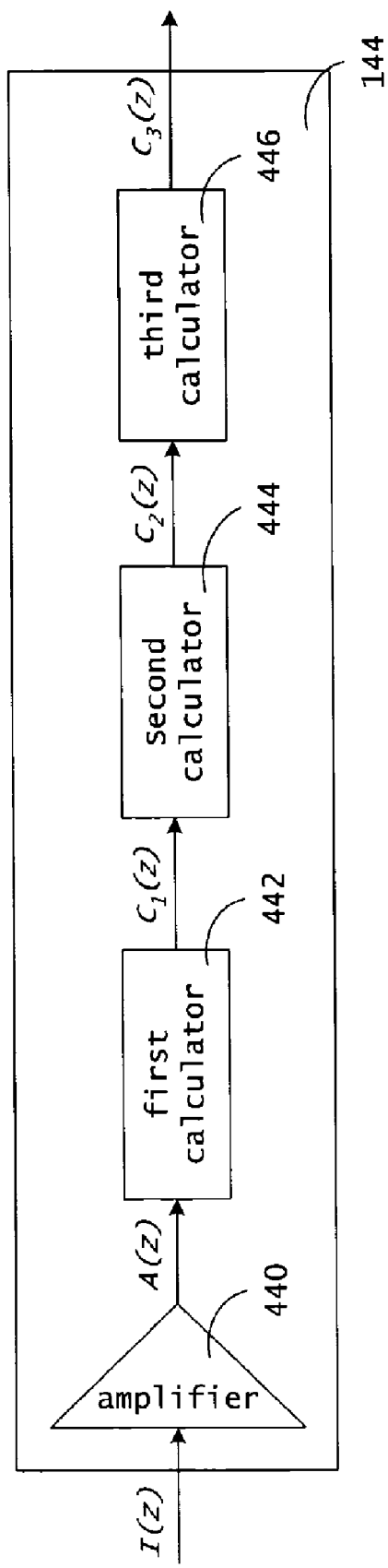
FIG. 3 is a block diagram of the controller of FIG. 1.

Referring also to FIG. 3, the controller 144 includes an amplifier 440, a first calculator 442, a second calculator 444, and a third calculator 446. The amplifier 440 is used for amplifying the digital signal I(z). The first calculator 442 is used for applying a first low-pass filtering operation. The second calculator 444 is used for applying a second low-pass filtering operation. The third calculator 446 is used for applying a third low-pass filtering operation.

The digital signal I(z) is amplified by the amplifier 440 and an amplified signal A(z) is obtained. The amplified signal A(z) can be represents the following equation:

$$A(z) = A * I(z) \quad (1)$$

wherein A represents an amplification coefficient of the amplifier 440. The amplification coefficient A is adjustable for specified applications. Exemplarily, the amplification coefficients A can be set to a value of 0.6250.

The amplified signal A(z) is then applied the first low-pass filtering operation by the first calculator 442 to obtain a first calculating signal C1(z). The first calculating signal C1(z) satisfies the following equation:

$$C1(z) = (K1 * A(z) + K2)/(A(z) - K3) \quad (2)$$

wherein K1, K2, and K3 are parameters of the first calculator 442 and adjustable for specified applications. Exemplarily, K1, K2, and K3 can be set to values of 0.2108, 0.2108, and 0.5784, respectively.

The first calculating signal C1(z) is then applied the second low-pass filtering operation by the second calculator 444 to obtain a second calculating signal C2(z). The second calculating signal C2(z) satisfies the following equation:

$$C2(z) = (M1 * C1(z) + M2)/(C1(z) - M3) \quad (3)$$

wherein M1, M2, and M3 are parameters of the second calculator 444 and adjustable for specified applications. Exemplarily, M1, M2, and M3 can be set to values of 0.0186, 0.0, and 0.0, respectively.

The second calculating signal C2(z) is then applied the third low-pass filtering operation by the third calculator 446 to obtain the digital controlling signal C3(z). The digital controlling signal C3(z) satisfies the following equation:

$$C3(z) = (C2(z) + N1)/(C2(z) - N2) \quad (4)$$

wherein N1 and N2 are parameters of the third calculator 446 and adjustable for specified applications. Exemplarily, N1 and N2 can be set to values of 0.0063 and 0.9824, respectively.

Figure 4:
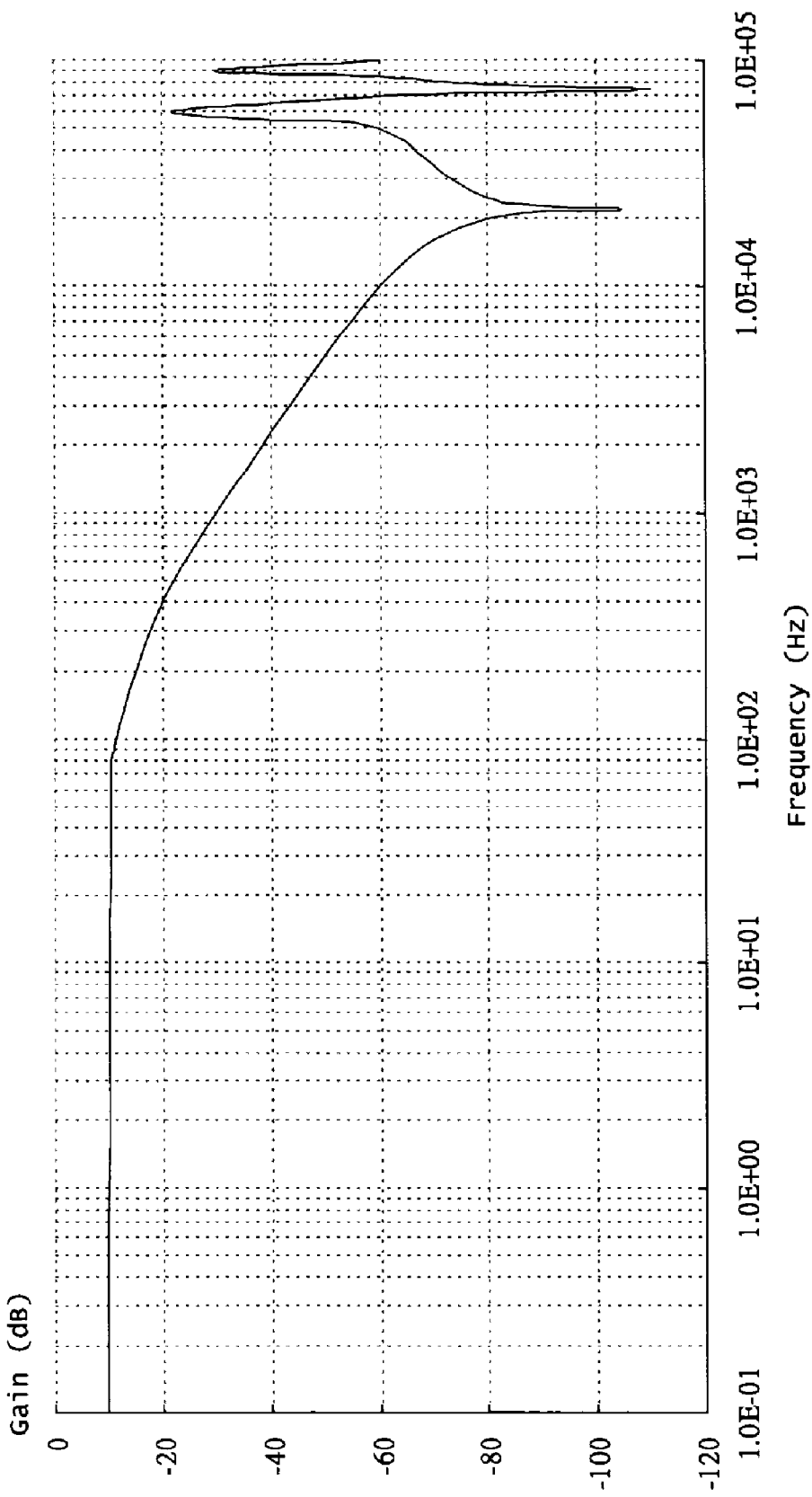
FIG. 4 is an exemplary bode diagram illustrating a frequency-gain curve of the controller of FIG. 1.
Figure 5:
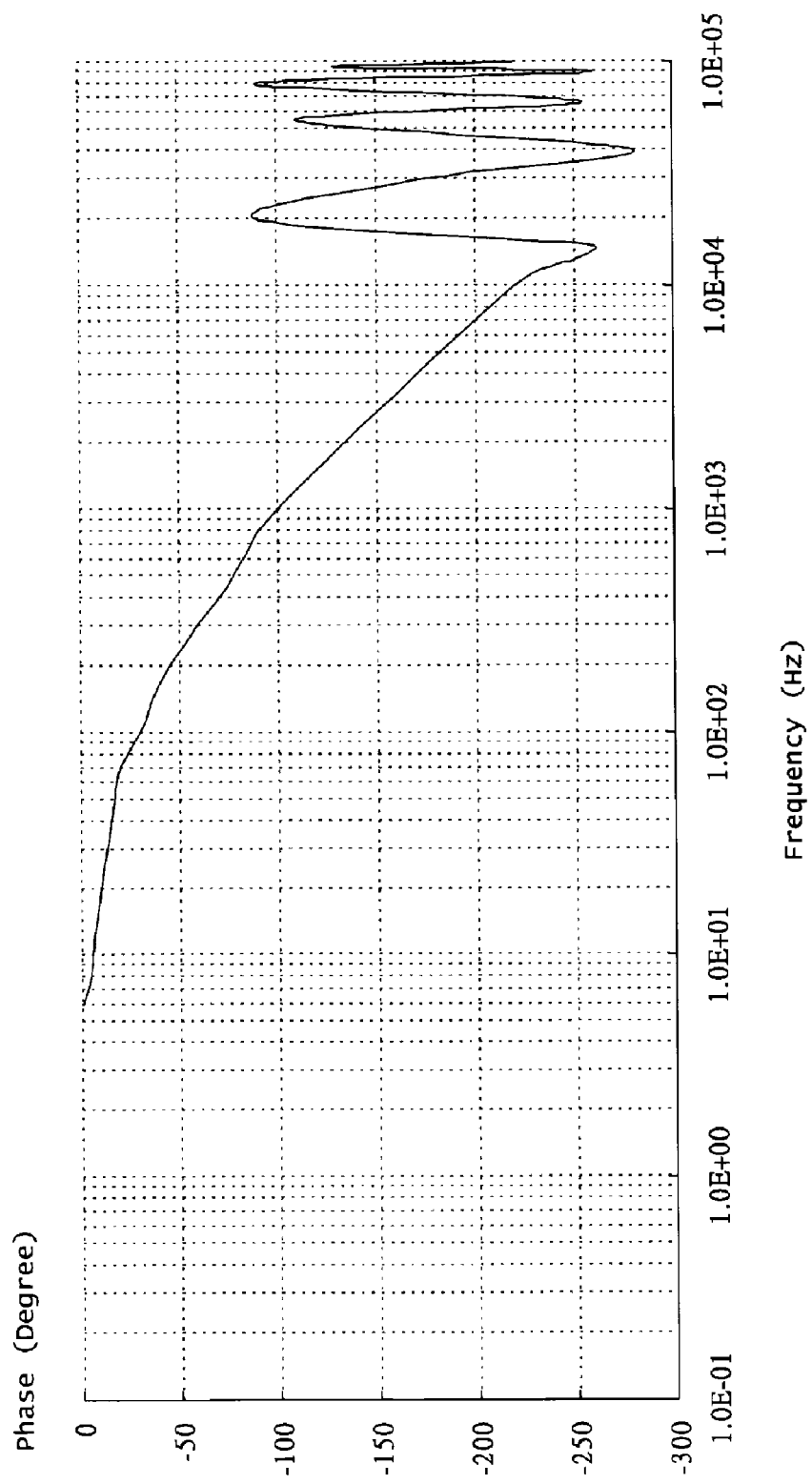
FIG. 5 is an exemplary bode diagram illustrating a frequency-phase curve of the controller of FIG. 1.

According to the equations (1), (2), (3), and (4), a relationship between the digital controlling signal $C_3(z)$ and the digital signal I(z) is clear. Referring to FIG. 4 and FIG. 5, a frequency-gain curve and a frequency-phase curve of the controller 144 are illustrated. According to the curves, it can be seen that the high frequency signal of the digital signal I(z), which is filtered out from the digital controlling signal $C_3(z)$, has sharp fluctuation that will cause noise.

Figure 6:
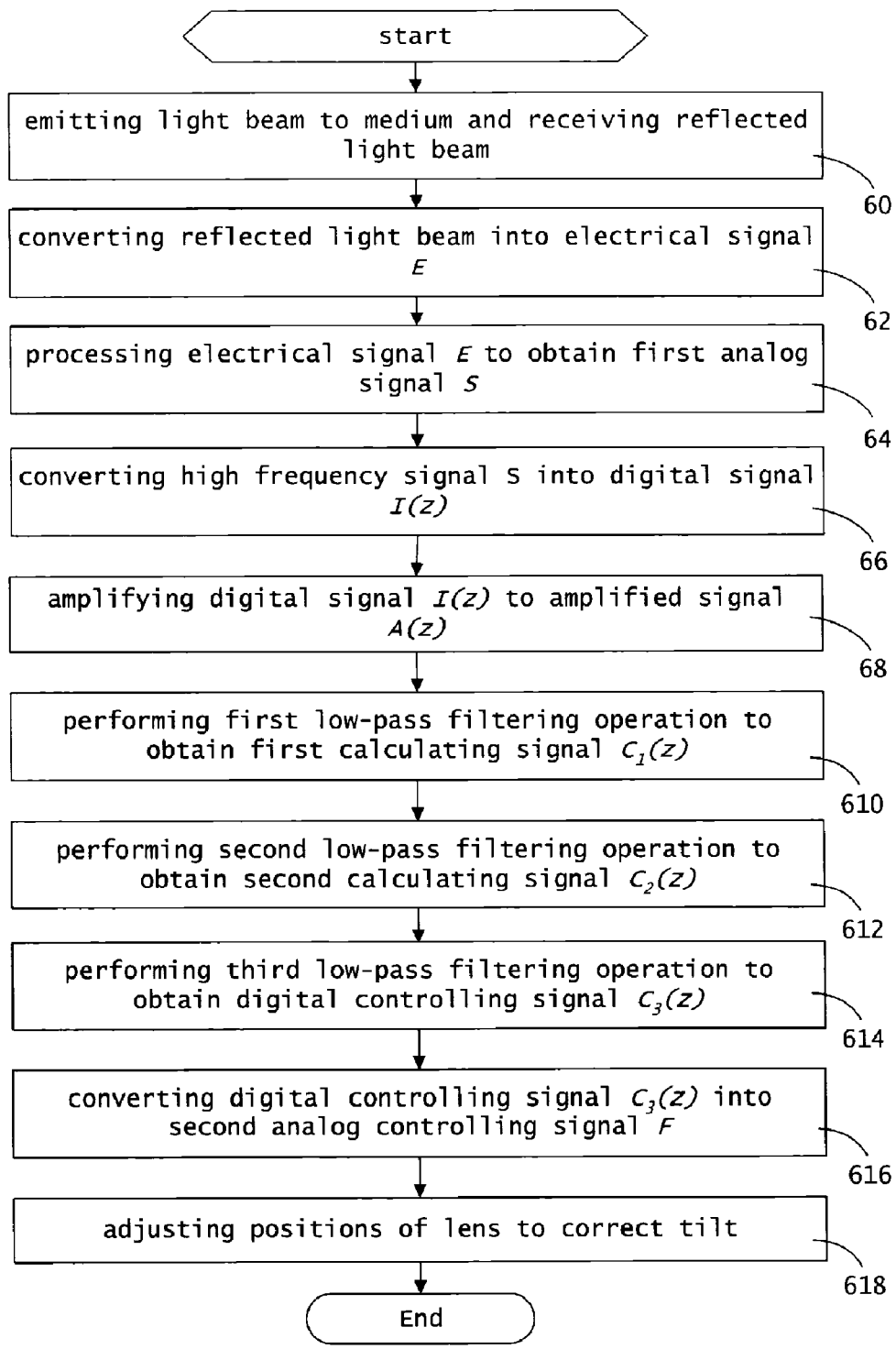
FIG. 6 is a flow chart illustrating a tilt detecting procedure of the information recording and or reproducing apparatus in accordance with an exemplary embodiment.
Figure 7:
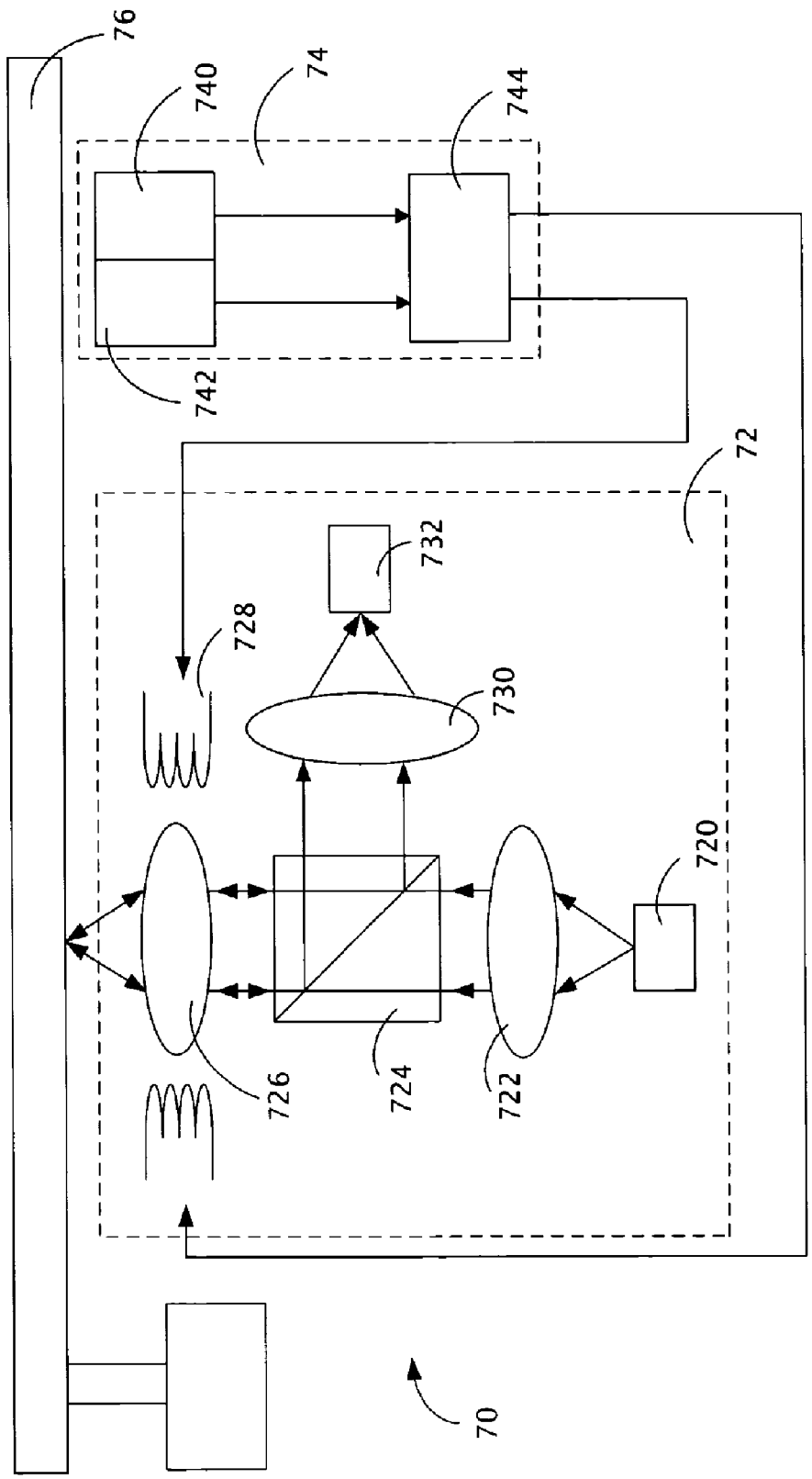
FIG. 7 is a schematic diagram of a general information recording and/or reproducing apparatus.

Referring to FIG. 6, an exemplary tilt detecting procedure is illustrated. First, in step 60, the light source 120 of the optical head 12 emits the light beam to focus on the medium 16, and the medium 16 reflects the incident light beam to form a reflected light beam to the photodetector 124.

Second, in step 62, the photodetector 124 converts the reflected light beam into the electrical signal E. The electrical signal E is then transmitted to the ASP 140.

Third, in step 64, the ASP 140 applies mathematical operations based on the electrical signal E, and then samples and amplifies the calculation result to obtain the first analog signal S.

Fourth, in step 66, the A/D converter 142 samples and quantizes the first analog signal S to obtain the digital signal I(z).

Fifth, in step 68, the digital signal I(z) is amplified by the amplifier 440 to obtain the amplified signal A(z).

Sixth, in step 610, the first calculator 442 applies the first low-pass filtering operation to obtain the first calculating signal C1(z).

Seventh, in step 612, the second calculator 444 applies the second low-pass filtering operation to obtain the second calculating signal C2(z).

Eighth, in step 614, the third calculator 446 applies the third low-pass filtering operation to obtain the digital controlling signal C3(z).

Subsequently, in step 616, the D/A converter 146 converts the digital controlling signal $C_3(z)$ into the second analog controlling signal F to send to the adjustment mechanism 126.

Finally, the adjustment mechanism 126 adjusts the operations of the lens 128 to correct the tilt between the light beam and the medium 16.

Since the electrical signal E include a tracking error signal and a focusing error signal, the tilt detecting device 14 can extract and obtain the tilt error signals from the electrical signal E. Thus, tilt detectors are not needed.

The embodiment described herein is merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. An information recording and/or reproducing apparatus, comprising:
    an optical head for emitting a light beam on a medium and receiving a reflected light beam from the medium, a tilt is defined by a deviation of the angle of the light beam from the medium;
    an analog signal processor for processing the reflected light beam to obtain a first analog signal;
    an analog/digital converter for converting the first analog signal into a digital signal;
    a controller for applying a low-pass filtering operation on the digital signal to obtain a digital controlling signal;
    a digital/analog converter for converting the digital controlling signal into a second analog signal; and
    an adjustment mechanism for adjusting a position of the optical head to correct the tilt according to the second analog signal;
    wherein the controller comprises a first calculator for applying a first low-pass filtering operation on the digital signal, the first calculator performing a function of:

$C_1(z)=(K_1*A(z)+K_2)/(A(z)-K_3)$ wherein $C_1(z)$ represents a signal which is outputted by the first calculator after applying the first low-pass filtering operation on the digital signal, $A(z)$ is the digital signal which is a variable parameter and represents an input signal of the first calculator, $K_1$, $K_2$, and $K_3$ are constant parameters of the first calculator, and z represents a frequency of the first analog signal.

2. The information recording and/or reproducing apparatus as claimed in claim 1, wherein the constant parameters $K_1$=0.2108, $K_2$=0.2108, and $K_3$=0.5784.

3. The information recording and/or reproducing apparatus as claimed in claim 1, further comprising a second calculator for applying a second low-pass filtering operation on the $C_1(z)$, the second calculator performing a function of:

$C_2(z)=(M_1*C_1(z)+M_2)/(C_1(z)-M_3)$ wherein $C_2(z)$ represents a signal which is outputted by the second calculator after applying the second low-pass filtering operation on the $C_1(z)$, $M_1$, $M_2$, and $M_3$ are constant parameters of the second calculator.

4. The information recording and/or reproducing apparatus as claimed in claim 3, wherein the constant parameters $M_1$=0.0186, $M_2$=0.0, and $M_3$=0.0.

5. The information recording and/or reproducing apparatus as claimed in claim 3, further comprising a third calculator for applying a third low-pass filtering operation on the $C_2(z)$, the third calculator performing a function of:

$C_3(z)=(C_2(z)+N_1)/(C_2(z)-N_2)$ wherein $C_3(z)$ represents a signal which is outputted by the third calculator after applying the third low-pass filtering $C_2(z)$, $N_1$, and $N_2$ are constant parameters of the third calculator.

6. The information recording and/or reproducing apparatus as claimed in claim 5, wherein the constant parameters $N_1$=0.0063, $N_2$=0.9824.

7. The information recording and/or reproducing apparatus as claimed in claim 1, wherein the controller comprises an amplifier for amplifying the digital signal inputted to the controller.

8. The information recording and/or reproducing apparatus as claimed in claim 7, wherein an amplification coefficient of the amplifier is set to a value of 0.6250.

9. A tilt detecting device for detecting a tilt detecting signal, the tilt detecting signal being relative to a tilt defined by a deviation of a light beam from a medium, the light beam emitted on the medium by an optical head, the tilt detecting device comprising:
    a first calculator for applying a first low-pass filtering operation on a digital signal corresponding to a reflected light beam from the medium, the first calculator performing a function of:

$C_1(z)=(K_1*A(z)+K_2)/(A(z)-K_3)$ wherein $C_1(z)$ represents a signal which is outputted by the first calculator after applying the first low-pass filtering operation on the digital signal, $A(z)$ is the digital signal which is a variable parameter and represents an input signal of the first calculator, $K_1$, $K_2$, and $K_3$ are constant parameters of the first calculator, and z represents a frequency of the first analog signal; and
    a second calculator for applying a second low-pass filtering operation on the $C_1(z)$ to obtain the tilt detecting signal, the second calculator performing a function of:

$C_2(z)=(M_1*C_1(z)+M_2)/(C_1(z)-M_3)$ wherein $C_2(z)$ represents the tilt detecting signal which is outputted by the second calculator after applying the second low-pass filtering operation on the $C_1(z)$, $M_1$, $M_2$, and $M_3$ are constant parameters of the second calculator.

10. The tilt detecting device as claimed in claim 9, wherein the constant parameters $K_1$=0.2108, $K_2$=0.2108, and $K_3$=0.5784.

11. The tilt detecting device as claimed in claim 9, wherein the constant parameters $M_1$=0.0186, $M_2$=0.0, and $M_3$=0.0.

12. The tilt detecting device as claimed in claim 9, further comprising a third calculator for applying a third low-pass filtering operation on the $C_2(z)$ to obtain the tilt detecting signal, the third calculator performing a function of:

$C_3(z)=(C_2(z)+N1)/(C_2(z)-N2)$ wherein $C_3(z)$ represents the tilt detecting signal which is outputted by the third calculator after applying the third low-pass filtering operation on the $C_2(z)$, $N_1$, and $N_2$ are constant parameters of the third calculator.

13. The tilt detecting device as claimed in claim 12, wherein the constant parameters $N_1$=0.0063, $N_2$=0.9824.

14. The tilt detecting device as claimed in claim 9, further comprising an amplifier for amplifying the digital signal inputted to the controller, and an amplification coefficient of the amplifier is set to a value of 0.6250.

15. A tilt detecting method for detecting a tilt detecting signal, the tilt detecting signal being relative to a tilt defined by a deviation of a light beam from a medium, the light beam emitted on the medium by an optical head, the tilt detecting method comprising steps of:
    receiving a reflected light beam from the medium;
    converting the reflected light beam into an electrical signal;
    converting the electrical signal into a digital signal;

applying a first low-pass filtering operation on the digital signal, the step implemented by a first calculator, the first calculator performing a function of:

$$C_1(z)=(K_1*A(z)+K_2)/(A(z)-K_3)$$

wherein $C_1(z)$ represents a signal which is outputted by the first calculator after applying the first low-pass filtering operation on the digital signal, A(z) is the digital signal which is a variable parameter and represents an input signal of the first calculator, $K_1$, $K_2$, and $K_3$ are constant parameters of the first calculator, and z represents a frequency of the first analog signal; and applying a second low-pass filtering operation on the $C_1(z)$ to obtain the tilt detecting signal, the step implemented by a second calculator, the second calculator performing a function of:

$$C_2(z)=(M_1*C_1(z)+M_2)/(C_1(z)-M_3)$$

wherein $C_2(z)$ represents the tilt detecting signal which is outputted by the second calculator after applying the second low-pass filtering operation on the $C_1(z)$, $M_1$, $M_2$, and $M_3$ are constant parameters of the second calculator.

16. The tilt detecting method as claimed in claim 15, further comprising a step of processing the electrical signal to obtain an analog signal that is then converted to the digital signal.

17. The tilt detecting method as claimed in claim 15, further comprising a step of amplifying the digital signal before the step of applying the first low-pass filtering operation.

18. The tilt detecting method as claimed in claim 15, further comprising a step of applying a third low-pass filtering operation on the $C_2(z)$ to obtain the tilt detecting signal, the step implemented by a third calculator, the third calculator performing a function of:

$$C_3(z)=(C_2(z)+N1)/(C_2(z)-N2)$$

wherein $C_3(z)$ represents the tilt detecting signal which is outputted by the third calculator after applying the third low-pass filtering operation on the $C_2(z)$, $N_1$, and $N_2$ are constant parameters of the third calculator.

19. The tilt detecting method as claimed in claim 15, wherein the constant parameters $K_1$=0.2108, $K_2$=0.2108, and $K_3$=0.5784.

20. The tilt detecting method as claimed in claim 15, wherein the constant parameters $M_1$=0.0186, $M_2$=0.0, and $M_3$=0.0.

* * * * *